United States Patent
Takeshita et al.

(10) Patent No.: US 6,341,030 B1
(45) Date of Patent: Jan. 22, 2002

(54) LIGHT BEAM OPTICAL SCANNER AND IMAGE FORMING APPARATUS

(75) Inventors: Kenji Takeshita, Toyokawa; Jun Kohsaka, Toyohashi; Yasushi Nagasaka, Okazaki, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/613,829

(22) Filed: Jul. 11, 2000

(30) Foreign Application Priority Data

Jul. 14, 1999 (JP) .......................................... 11-200369

(51) Int. Cl.$^7$ ............................................... G02B 26/08
(52) U.S. Cl. ...................... 359/216; 359/212; 359/214; 359/223; 347/261
(58) Field of Search ................................ 359/196, 197, 359/212–221, 223–226, 584, 884, 885; 347/256–261

(56) References Cited

U.S. PATENT DOCUMENTS

| | | | |
|---|---|---|---|
| 5,126,873 A | * | 6/1992 | Ang .......................... 359/217 |
| 5,315,427 A | | 5/1994 | Rauch et al. |
| 5,706,119 A | | 1/1998 | Anzai |
| 5,946,125 A | * | 8/1999 | Ang .......................... 359/216 |
| 5,953,147 A | * | 9/1999 | Brandt et al. ................ 359/212 |

FOREIGN PATENT DOCUMENTS

JP          9-211366          8/1997

* cited by examiner

*Primary Examiner*—James Phan
(74) *Attorney, Agent, or Firm*—Morrison & Foerster LLP

(57) ABSTRACT

In an optical system, the scanning center axis of a scanning lens, the principal ray of a laser beam applied to the scanning lens, and the rotational axis of a polygon mirror are in one plane. By forming a thin film layer on the deflecting facets, the exposure quantity of a photo conductor, which decreases as the incident angle to the deflecting facet increases, is corrected. The thin film layer has the increasing ratio of the reflectance that increases as the incident angle, which principal ray of the laser beam forms with the normal line to the deflecting facet of the polygon mirror, increases.

13 Claims, 12 Drawing Sheets

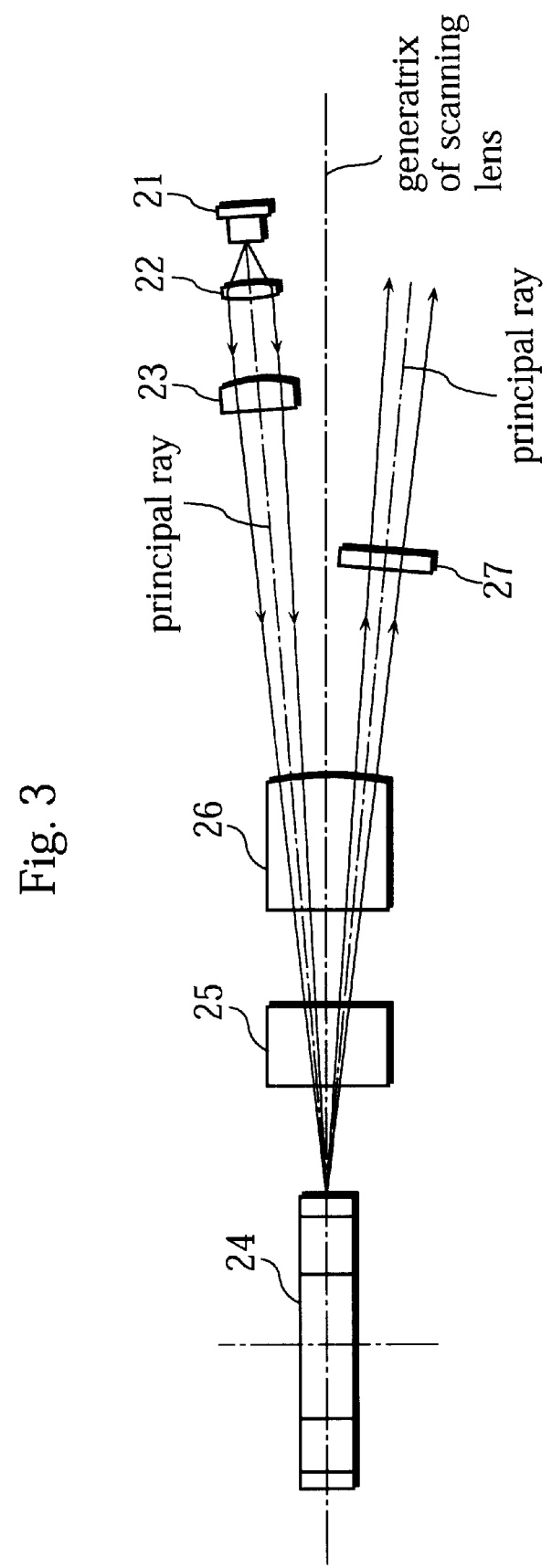

Fig. 8

|  |  | practical example 1 | practical example 2 | practical example 3 | practical example 4 |
|---|---|---|---|---|---|
| place for forming |  | deflecting facet | incidence plane | incidence plane | incidence plane |
| first layer | medium | SiO2 | SiO2 | SiO2 | SiO2 |
|  | thickness | 0.41 λ | 0.44 λ | 0.26 λ | 1.0 λ |
| second layer | medium | TiO2 | TiO2 | TiO2 | TiO2 |
|  | thickness | 0.78 λ | 0.75 λ | 1.19 λ | 0.28 λ |
| third layer | medium | — | SiO2 | — | AL2O3 |
|  | thickness | — | 0.52 λ | — | 0.60 λ |
| fourth layer | medium | — | — | — | TiO2 |
|  | thickness | — | — | — | 0.78 λ |

$\lambda = 780$ nm

Fig. 9 incident angle α and increasing ratio of reflectance

| angle($\alpha$) | single-layer coat:SiO2 | practical example 1 | practical example 2 |
|---|---|---|---|
| 0 | 1 | 1 | 1 |
| 5 | 1.001 | 1.009 | 1.013 |
| 10 | 1.003 | 1.033 | 1.054 |
| 15 | 1.006 | 1.072 | 1.121 |
| 20 | 1.010 | 1.120 | 1.208 |
| 25 | 1.015 | 1.171 | 1.301 |

Fig. 11 incident angle α and increasing ratio of transmissivity

| angle($\alpha$) | single-layer coat:MgF2 | practical example 3 | practical example 4 |
|---|---|---|---|
| 0 | 1.000 | 1.000 | 1.000 |
| 5 | 1.000 | 1.007 | 1.016 |
| 10 | 1.001 | 1.029 | 1.066 |
| 15 | 1.003 | 1.066 | 1.152 |
| 20 | 1.005 | 1.120 | 1.281 |
| 25 | 1.008 | 1.192 | 1.457 |

LIGHT BEAM OPTICAL SCANNER AND IMAGE FORMING APPARATUS

This application is based on an application No. 11-200369 filed in Japan, the content of which is hereby incorporated by reference.

BACKGROUND OF THE INVENTION

(1) Field of the Invention

The present invention relates to an overfilled light beam optical scanner and an image forming apparatus equipped with the overfilled light beam optical scanner.

(2) Related Art

Conventionally, the laser optical scanner that is used for the image forming apparatus such as the laser printer and the digital copying machine is categorized into the underfilled laser optical scanner and the overfilled laser optical scanner. In the case of the underfilled laser optical scanner, the beam of incident light applied to the deflector has the width smaller than the width of the deflecting facet of the deflector in the direction of scanning. On the other hand, the width of the incident light beam in the case of the overfilled laser optical scanner is larger than the width of the deflecting facet.

High-speed scanning can be realized for the overfilled optical scanner by increasing the number of the reflecting mirrors of the deflector, i.e., a polygon mirror, so that it is not necessary to increase the rotation speed and the size of the polygon mirror unlike the underfilled optical scanner. This is an advantage of the overfilled optical scanner. On the other hand, the amount of light of the beam that is applied to the surface of the photo conductor after deflected by the deflector (referred to "reflected beam" in this specification) changes as the polygon mirror rotates, i.e., the exposure strength varies as one line of the surface of the photo conductor is exposed.

In order to overcome the problem, solutions have been proposed so as to solve the uneven quantity of light due to the reflected beam change and the luminous flux width change, i.e., so as to expose the surface of the photo conductor with a certain level of exposure strength from the start through the end of the exposure. More specifically, Japanese Patent Laid-Open Publication No. 6-214184 (referred to as "the first prior art" in this specification) discloses how to improve the evenness of light quantity by reducing the first factor. On the other hand, Japanese Patent Laid-Open Publication Nos. 8-160338 (referred to as "the second prior art" in this specification) and 9-211366 (referred to as "the third prior art" in this specification) discloses how to improve the evenness of light quantity by reducing the first and second factors.

According to the first prior art, additional optical element (lens) is disposed between the light source and the deflector to uniformize the intensity distribution of the beam applied to the deflector. According to the second prior art, a filter with irregular transmissivity distribution in the scanning direction is disposed between the light source and the deflector to improve the evenness of the light quantity of beam applied to the photo conductor. According to the third prior art, the principal ray of the beam from the light source is inclined so as to change the proportion of the quantity of the light that is not applied to the deflecting facet (eclipsed part) according to the beam incident angle to the deflecting facet, so that the light quantity of the reflected beam is set to be almost the same.

These proposed solutions, however, are also problematic. As for the first and second prior arts, an optical element such as the lens and the filter needs to be additionally disposed, leading to upsizing and high cost of the optical scanner. As for the third prior art, the beam is unevenly shaped since the eclipsed part is positioned on one side of the beam, and the effect of the light quantity evenness improvement is lessened when a slight error of the position of the light source occurs since high precision is required to incline the principal ray of the beam.

SUMMARY OF THE INVENTION

It is accordingly the object of the present invention to provide an overfilled light beam optical scanner and an image forming apparatus provided with the light beam optical scanner that exposes the surface of the photo conductor at a certain level of exposure strength by keeping the light quantity applied to the surface of the photo conductor at a certain level without upsizing and increasing the cost of the light beam optical scanner, changing the beam shape, and precise adjustment of the beam inclination.

The above-mentioned object may be achieved by a light beam optical scanner that includes: a light source that emits a light beam; a deflector having a plurality of deflecting facets that have widths smaller than a width of the light beam, at least two of the deflecting facets being irradiated by the light beam and deflecting the light beam; an optical element that is disposed so that a deflected light beam is applied to the optical element, the deflected light beam being a beam that has been deflected by one of the deflecting facets, the optical element being one of a first optical element through which the deflected light beam passes and a second optical element that reflects the deflected light beam, an incident angle of the deflected light beam applied to an incidence plane of the optical element changing according to an angle of deflection at which the deflecting facet has deflected the light beam; and a thin film with which at least one of an incidence plane of the first optical element, an incidence plane of the second optical element, an emission plane of the first optical element, and the deflecting facet is provided, reflectance and transmissivity of the thin film depending on the incident angle.

In the light beam optical scanner, a thin film that has transmissivity and reflectance depending on the incident angle is disposed on the deflecting facets of the deflector or the plane of incidence or the transmitted light emission plane of the optical element. As a result, the light quantity for exposing the photo conductor, which changes according to the incident angle, is appropriately corrected, so that the surface of the photo conductor is exposed at a certain level of exposure strength.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 3 is a side view of the optical system when viewed from a point B in FIG. 2;

FIG. 8 shows patterns of the thin film layer that is formed on different places on different conditions;

FIG. 9 shows the increasing ratio of reflectance against the incident angle α when the thin film layer is formed on the reflective surface;

FIG. 11 shows the increasing ratio of transmissivity against the incident angle α when the thin film layer is formed on the incidence plane of the optical element.

DESCRIPTION OF THE PREFERRED EMBODIMENT

An explanation of the preferred embodiment of the light beam optical scanner according to the present invention with reference to figures will be given below by taking the digital copying machine (referred to the "copying machine" in this specification) as an example.

(Construction of Copying Machine)

Figure 1:
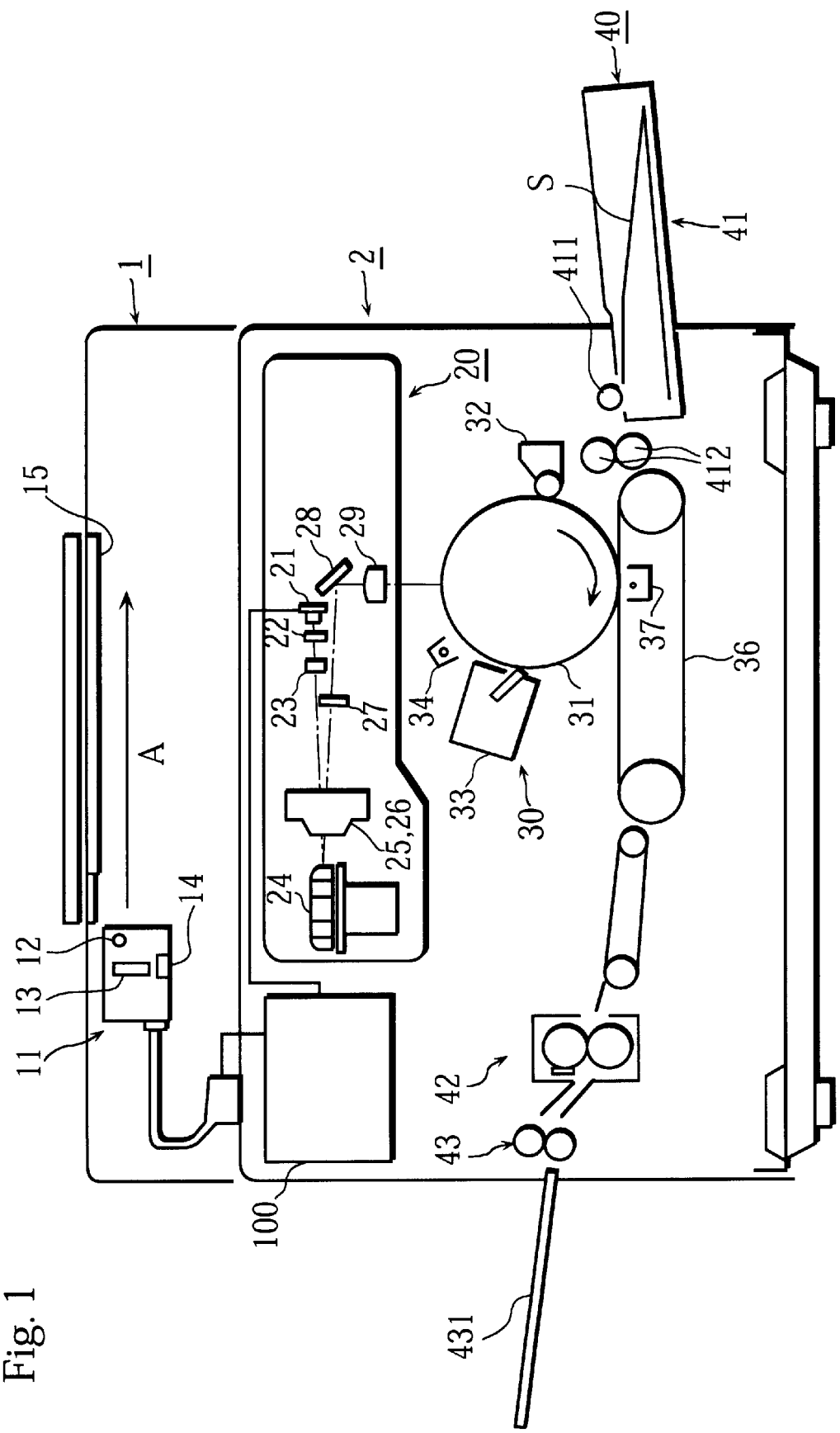
FIG. 1 shows the construction of a copying machine provided with the laser optical scanner according to the preferred embodiment of the present invention.

FIG. 1 is a schematic diagram showing the construction of the copying machine provided with the laser optical scanner according to the preferred embodiment of the present invention. As shown in FIG. 1, the copying machine includes a image reading unit 1 for reading the original image and a printing unit 2 for printing the read image on the recording sheet S.

The image reading unit 1, which is well known in the art, reads the image on the original that has been set on an original glass plate 15 by moving a scanner 11. The original image is irradiated by an exposure lamp 12 that is included in the scanner 11 and the image of the original image is formed by a rod lens array 13. The formed image is converted into an electrical signal after the optical-electrical conversion in a CCD (Charge Coupled Device) image sensor 14 to obtain image data. The image data undergoes a variety of data processing in a control unit 100 in the printing unit 2 and is output to the printing unit 2 as a driving signal for the laser diode.

The printing unit 2 forms the image according to the electrophotographic method. The printing unit 2 includes an optical system 20, an image processing system 30 and a paper feeding system 40.

The optical system 20 receives the driving signal from the control unit 100, emits a laser beam corresponding to the image data, and exposes the surface of a photoconductive drum 31 to form an electrostatic latent image. A more detailed explanation of the optical system 20 will be given later in terms of the construction and operations.

The image processing system 30 includes the photoconductive drum 31, a sensitizing charger 34, a developing unit 32, and a cleaner 33. The sensitizing charger 34, the developing unit 32, and the cleaner 33 are disposed around the photoconductive drum 31.

The cleaner 33 removes the residual toner on the surface of the photoconductive drum 31 before the surface of the photoconductive drum 31 is exposed. Then, the photoconductive drum 31 is irradiated by an eraser lamp (not illustrated) to neutralize any surface potential remaining on the surface, and the entire surface is charged by the sensitizing charger 34. In this condition, the surface of the photoconductive drum 31 is exposed by the laser beam from the optical system 20 and the electrostatic latent image is formed on the surface.

The developing unit 32 develops the electrostatic latent image on the surface of the photoconductive drum 31 using toner to form a toner image on the surface of the photoconductive drum 31.

Meanwhile, a recording sheet S that has been kept in a paper feed cassette 41 in a paper feeding system 40 is transported to the transfer position under the bottom of the photoconductive drum 31 via a pick-up roller 411, a pair of timing rollers 412 and a paper transport belt 36.

At the transfer position, a transfer charger 37 is positioned on the opposite side of the paper transport belt 36 to the photoconductive drum 31 so that the toner image on the surface of the photoconductive drum 31 is transferred onto the recording sheet S by the static electricity. The recording sheet S onto which the toner image has been transferred is transported to a fixing unit 42. Here, the toner on the recording sheet S is fixed onto the recording sheet S with heat and pressure. Then, the recording sheet S is transported to a paper tray 431.

(Construction of Optical System 20)

Figure 2:
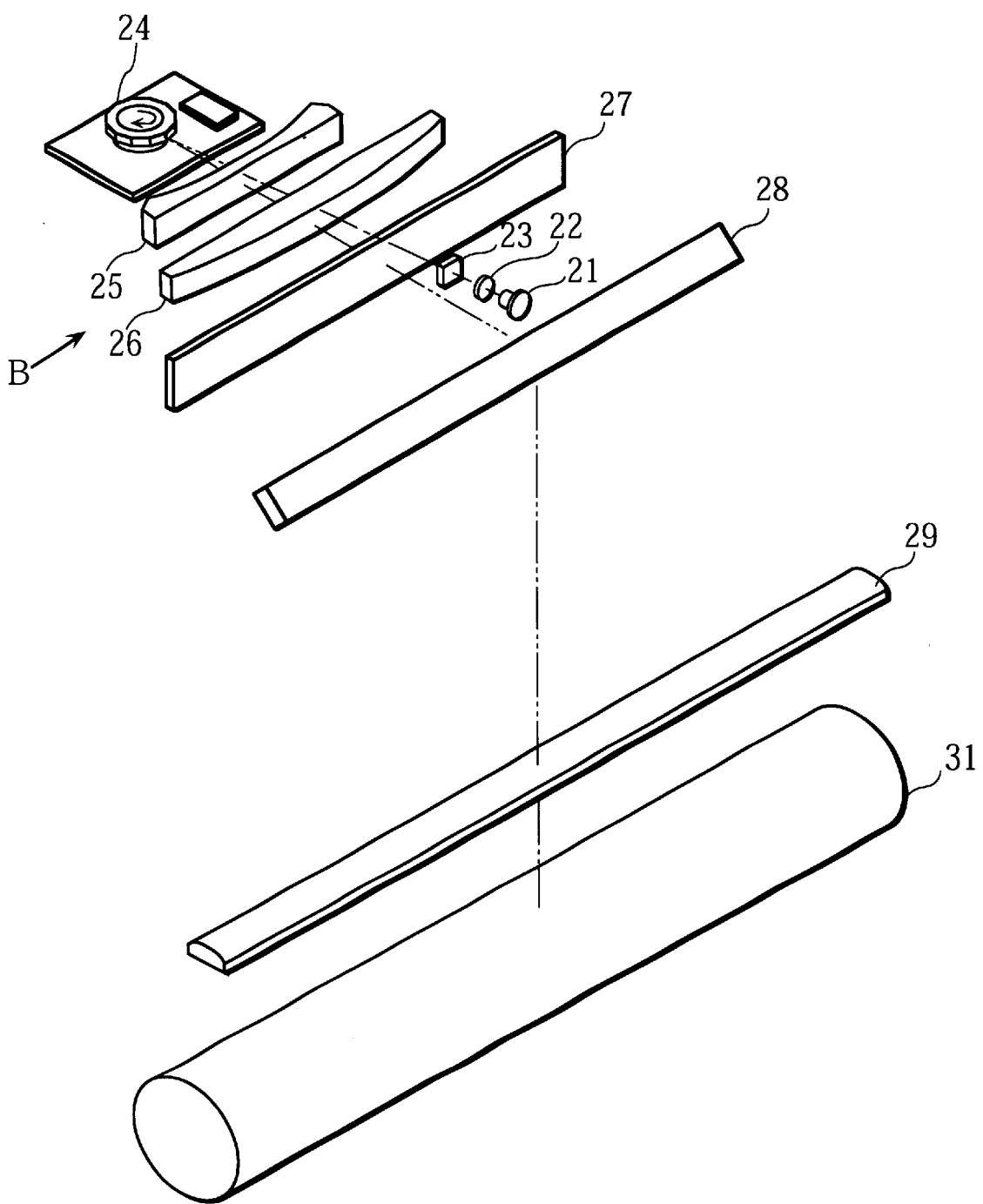
FIG. 2 is a perspective view of the main part of the optical system of the copying machine in FIG. 1.

FIG. 2 is a perspective view of the main part of the optical system 20 in FIG. 1. For convenience in explanation, the photoconductive drum 31 is also shown in FIG. 2.

The optical system 20 is an overfilled laser optical scanner. The optical system 20 includes a laser diode 21, a collimator lens 22, a first cylindrical lens 23, scanning lenses 25 and 26, a window 27, a reflecting mirror 28, and a second cylindrical lens 29 aside from a polygon mirror 24. The polygon mirror 24 has 12 deflecting facets, driven by a motor, and rotates at a fixed speed.

In the optical system 20, the laser beam from the laser diode 21 is changed into a parallel beam by the collimator lens 22, is converged in the sub scanning direction, and is applied to the deflecting facet of the polygon mirror 24.

The laser beam applied to the polygon mirror 24 is reflected by the deflecting facet and the deflection angular velocity of the reflected beam is adjusted by the scanning lenses 25 and 26 so as to scan the photoconductive drum 31 at a certain speed. Then, the beam passes through the window 27 and is reflected by the reflecting mirror 28. After that the beam is converged by the second cylindrical lens 29 in the sub scanning direction to form an image in a predetermined shape of spot in the scanning line on the photoconductive drum 31.

The scanning lenses 25 and 26, the window 27, the reflecting mirror 28, and the second cylindrical lens 29, are optical elements that the reflected laser beam passes through or that reflects the reflected laser beam. The reflected laser beam passes through or reflected by the optical elements scans a predetermined area as a result of the rotation of the polygon mirror 24. Here, the optical path of the reflected laser beam that is applied to the center of the scanned area is called the "scanning center axis" of the optical elements. The scanning center axis is indicated by the phantom line in FIG. 2.

Note that the optical system 20 is an overfilled laser optical scanner, so that the width of the laser beam applied to the polygon mirror 24 in the main scanning direction is larger than the width of the deflecting facet of the polygon mirror 24 in the rotating direction.

Meanwhile, for the optical system 20 in the preferred embodiment, the scanning center axis of the scanning lenses 25 and 26, the principal ray of the incident laser beam, and the rotational axis of the polygon mirror 24 are in one plane. As shown in FIG. 3, the principal ray of the incident laser beam is almost parallel to the principal ray of the reflected beam in the plane. As a result, there is a relationship between the angle that the principal ray of the incident laser beam forms with the principal ray of the reflected beam (referred to an "angle of deflection $\theta$" in this specification, refer to FIGS. 4A to 4C) and the angle that the normal line to the deflecting facet forms with the incident laser beam applied to the deflecting facet (referred to a "deflecting facet incident angle $\beta$" in this specification, refer to FIGS. 5A to 5C). The relationship is "the angle of deflection $\theta \div 2$ = deflecting facet incident angle $\beta$" (the angle that the scanning center axis of the scanning lenses forms with the normal line to the deflecting facet=the angle that the principal ray of the incident laser beam applied to the deflecting facet forms with the normal line to the deflecting facet). This relationship means that the deflecting facet incident angle $\beta$ increases as the angle of deflection $\theta$ increases and the deflecting facet incident angle $\beta$ decreases as the angle of deflection $\theta$ decreases.

As mentioned before, for the overfilled laser optical scanner, as the angle of deflection $\theta$, i.e., the deflecting facet incident angle $\beta$ increase, the light quantity of the beam for exposing the photo conductor decreases to cause uneven exposure light quantity. Here, explanations of the uneven light quantity caused by the angle of deflection $\theta$ and the deflecting facet incident angle $\beta$ will be given in order.

First, the uneven light quantity is caused by the angle of deflection $\theta$ in this manner. The luminous flux width of the beam that has been deflected by the deflecting facet toward the photoconductive drum 31 (reflected beam) changes according to the angle of deflection $\theta$ as the polygon mirror 24 rotates. The following is an explanation with reference to figures.

Figure 4A:
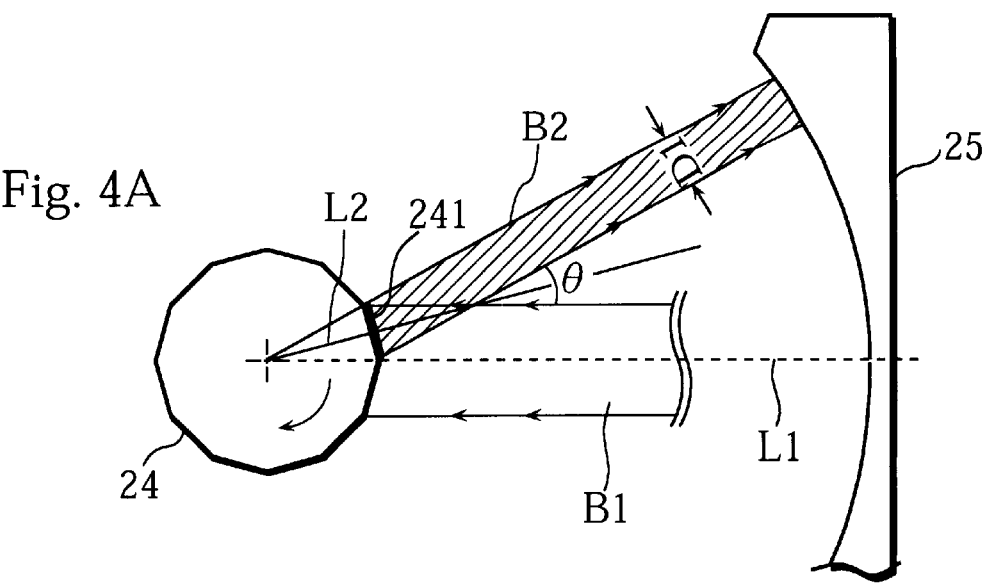
FIGS. 4A to 4C show how the luminous flux width of the reflected beam typically changes according to the angle of deflection θ.
Figure 4B:
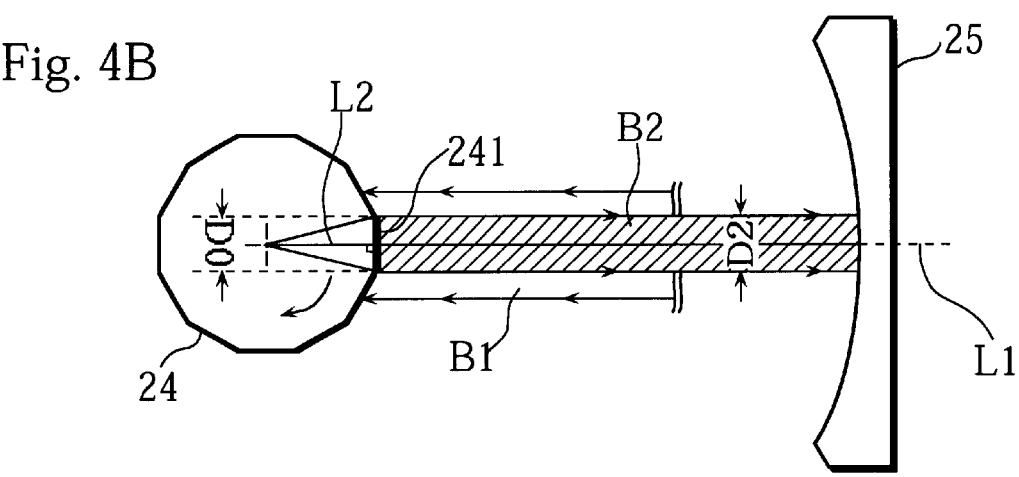
Figure 4C:
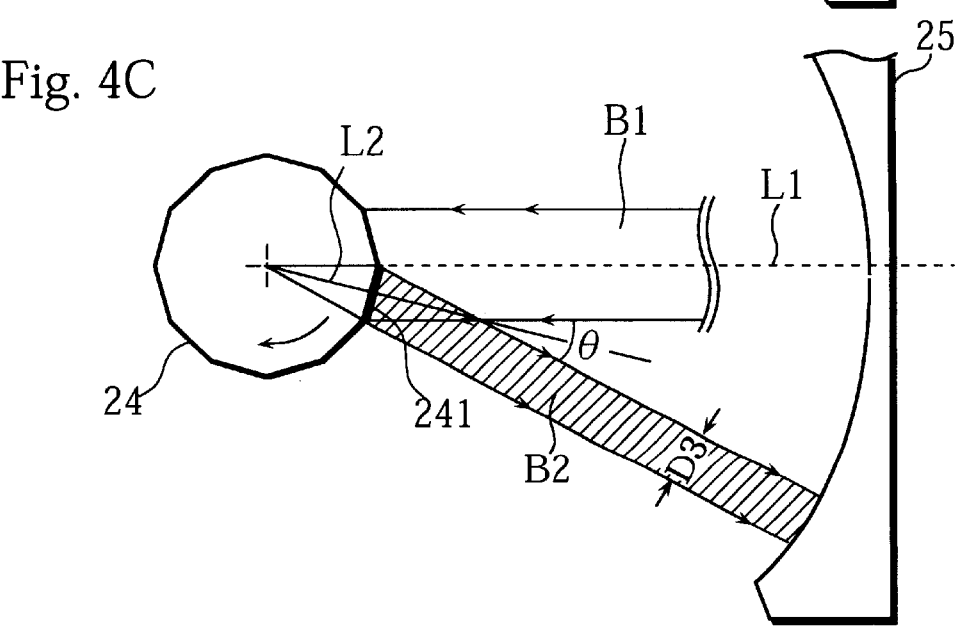

FIGS. 4A to 4C show how the luminous flux width of the reflected beam changes as the polygon mirror 24 rotates. Suppose that the beam applied to the polygon mirror 24 from the laser diode 21 is a laser beam 1 and the beam that has been deflected by a deflecting facet 241 is a reflected laser beam B2. The angle that the principal ray of the laser beam B1 forms with the principal ray of the reflected laser beam B2 is the angle of deflection $\theta$.

FIG. 4A shows the condition of the reflected laser beam B2 when the reflected laser beam B2 is positioned where the photoconductive drum 31 starts to be exposed, i.e., where the scanning according to the image data starts (the condition of SOI: Start of Image). FIG. 4B shows the condition of the reflected laser beam B2 when the reflected laser beam B2 is positioned at the midpoint of scanning (the condition of COI: Center of Image). FIG. 4C shows the condition of the reflected laser beam B2 when the reflected laser beam B2 is positioned at the end of scanning (the condition of EOI: End of Image).

The angle of deflection $\theta$ is the largest when the reflected laser beam B2 is in the condition of the SOI as shown in FIG. 4A and decreases as the polygon mirror 24 rotate in the direction of the arrow. When the reflected laser beam B2 is in the condition of the COI as shown in FIG. 4B, the angle of deflection $\theta$ is "0". Then, the angle of deflection $\theta$ starts to increase as the polygon mirror 24 rotate and is the largest when the reflected laser beam B2 is in the condition of the EOI as shown in FIG. 4C.

According to the angle of deflection $\theta$, the luminous flux width of the reflected laser beam B2 (luminous flux widths D1, D2, and D3) changes. For instance, suppose that the width of the deflecting facet 241 in the main scanning direction is D0. The luminous flux width of the reflected laser beam B2 is indicated by an expression, $D0 \times \cos(\theta/2)$. As a result, the luminous flux width of the reflected laser beam B2 decreases as the angle of deflection $\theta$ increases. In the example shown in FIGS. 4A to 4C, the luminous flux width D2 is the largest (=D0) when the reflected laser beam B2 is in the condition of the COI and the luminous flux widths D1 and D3 is the smallest when the reflected laser beam B2 is in the condition of the SOI or EOI. The change of the luminous flux width of the reflected laser beam B2 means that the light quantity of the beam for exposing the surface of the photoconductive drum 31 changes as the condition of the reflected laser beam B2 changes from the SOI to the EOI according to the angle of deflection $\theta$, i.e., that the light quantity (exposure strength) is not even during one line of exposure of the photoconductive drum 31 in the main scanning direction.

On the other hand, the uneven light quantity is caused by the deflecting facet incident angle $\beta$ in this manner. The strength of the reflected laser beam changes according to the deflecting facet incident angle $\beta$. The following is an explanation with reference to figures.

Figure 5A:
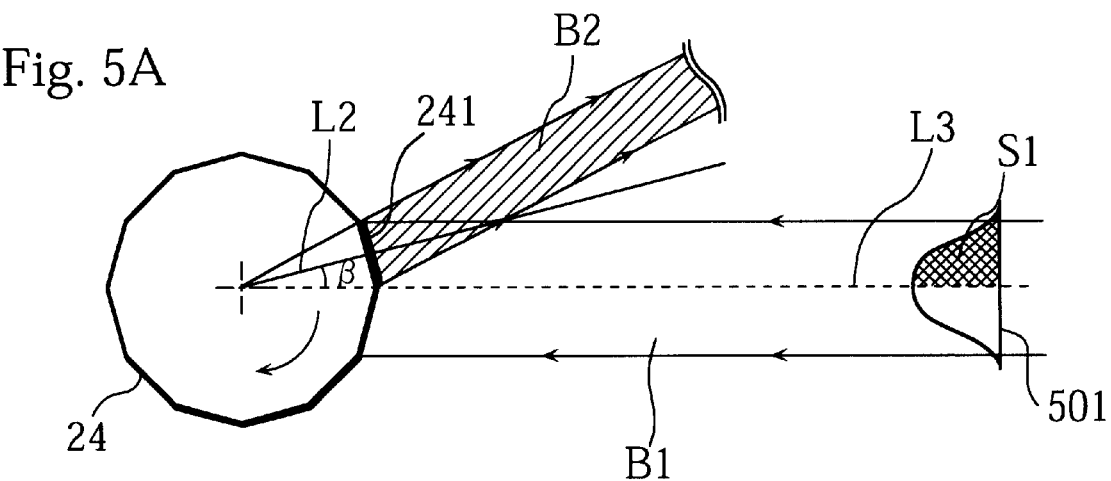
FIGS. 5A to 5C show how the distribution of the beam intensity typically changes according to the deflecting facet incident angle β.
Figure 5B:
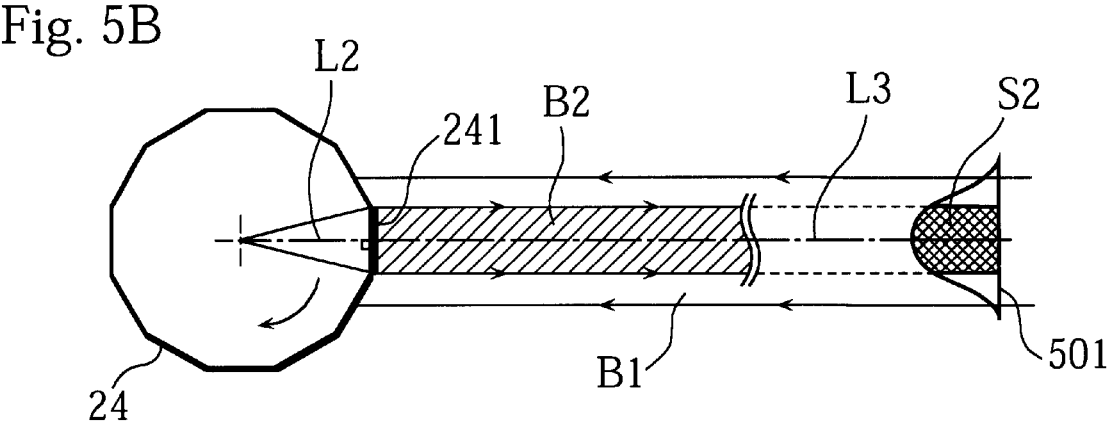
Figure 5C:
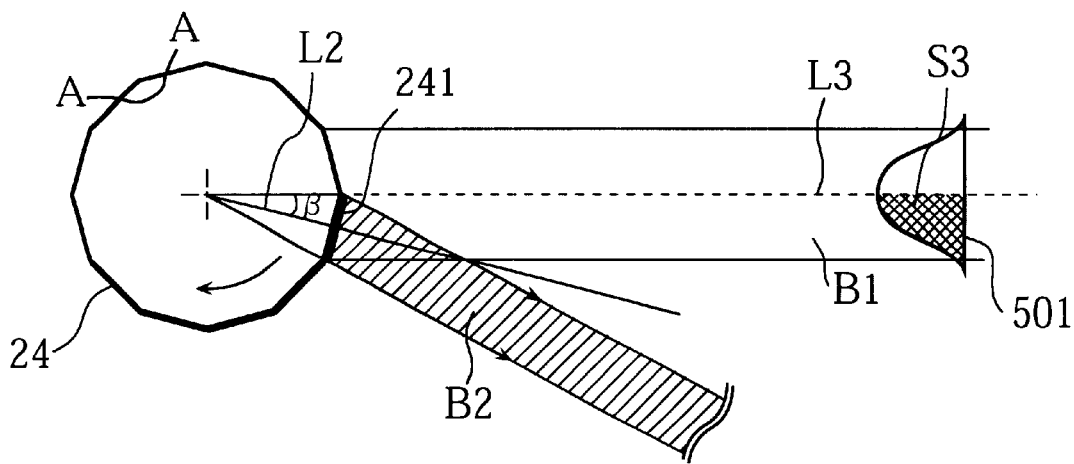

FIGS. 5A to 5C show how the part of an intensity distribution corresponding to the reflected laser beam B2 typically changes according to rotation of the polygon mirror 24. In FIGS. 5A to 5C, the angle that a normal line L2 to the deflecting facet 241 forms with a principal ray L3 of the laser beam B1 is the deflecting facet incident angle $\beta$.

An intensity distribution 501 of the laser beam B1 is a Gaussian distribution, which has a bell shape so that the laser beam B1 is strongest at the central point and weakest at the edge.

FIGS. 5A, 5B, and 5C show the conditions when the reflected laser beam B2 is in the conditions of the SOI, COI, and EOI, respectively. The diagonally shaped area in each of FIGS. 5A, 5B, and 5C indicates the area of the intensity distribution 501 corresponding to the reflected laser beam B2 (areas S1, S2, and S3). The light quantity (strength) of the reflected laser beam B2 that is to expose the surface of the photoconductive drum 31 is expressed by the integral of the diagonally shaped area. Since the central point is the peak in the Gaussian distribution, the light quantity increases as the area corresponding to the reflected laser beam B2 closes to the central point. More specifically, the light quantity is the largest in FIG. 5B, where the reflected laser beam B2 is in the condition of the COI and corresponds to the area S2. On the other hand, the light quantity is the smallest in FIGS. 5A and 5C, where the reflected laser beam B2 is in the conditions of the SOI and EOI and correspond to the areas S1 and S3. In the relationship with the deflecting facet incident angle $\beta$, the light quantity of the reflected laser beam B2 increases as the deflecting facet incident angle $\beta$ decreases, i.e., as the condition of the reflected laser beam B2 changes from the SOI to the COI. On the other hand, the light quantity of the as the reflected laser beam B2 decreases as the deflecting facet incident angle $\beta$ increases, i.e., as the condition of the reflected laser beam B2 changes from the COI to the EOI.

In the optical system 20, as the countermeasure against the light quantity unevenness caused by the two factors, a thin film layer with the property of having larger increasing ratio of the reflectance against the beam incident angle as the beam incident angle (deflecting facet incident angle β, i.e., angle of deflection θ÷2) increases is formed on the deflecting facets 241 of the polygon mirror 24.

Figure 6:
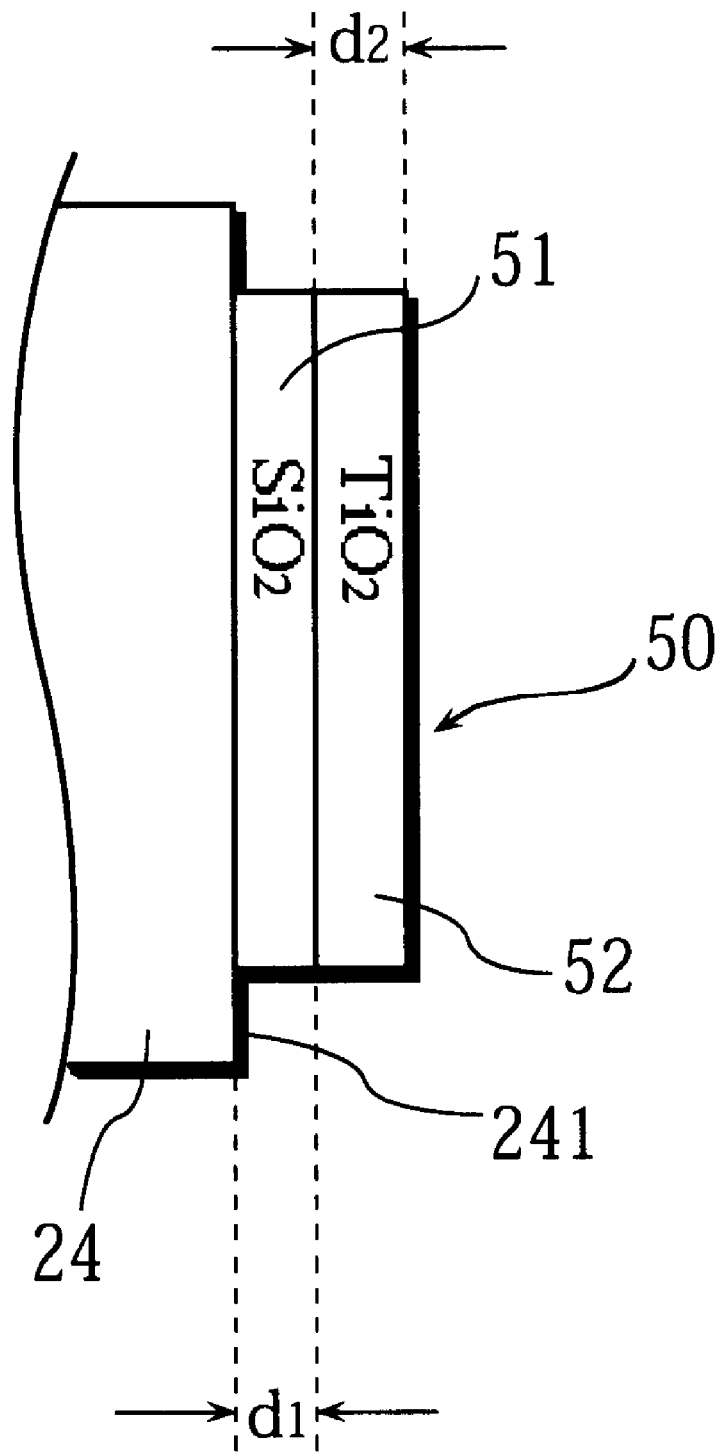
FIG. 6 shows the structure of the thin film layer according to the preferred embodiment.

FIG. 6 is an enlarged fragmentary view of the polygon mirror 24 seen from the direction perpendicular to the rotation axis. A thin film layer 50 that has been formed by evaporation has two-layer structure. The medium of a first layer 51 is silicon dioxide ($SiO_2$). The thickness d1 is 0.41λ (λ=780 nm). On the other hand, the medium of a second layer 52 is titanium dioxide ($TiO_2$). The thickness d2 is 0.78λ. With the thin film layer 50, the reflectance of the deflecting facet 241 increases as the deflecting facet incident angle β increases. Note that a thin film layer with the same structure as the thin film layer 50 is formed on each of the deflecting facets 241 of the polygon mirror 24.

Figure 7:
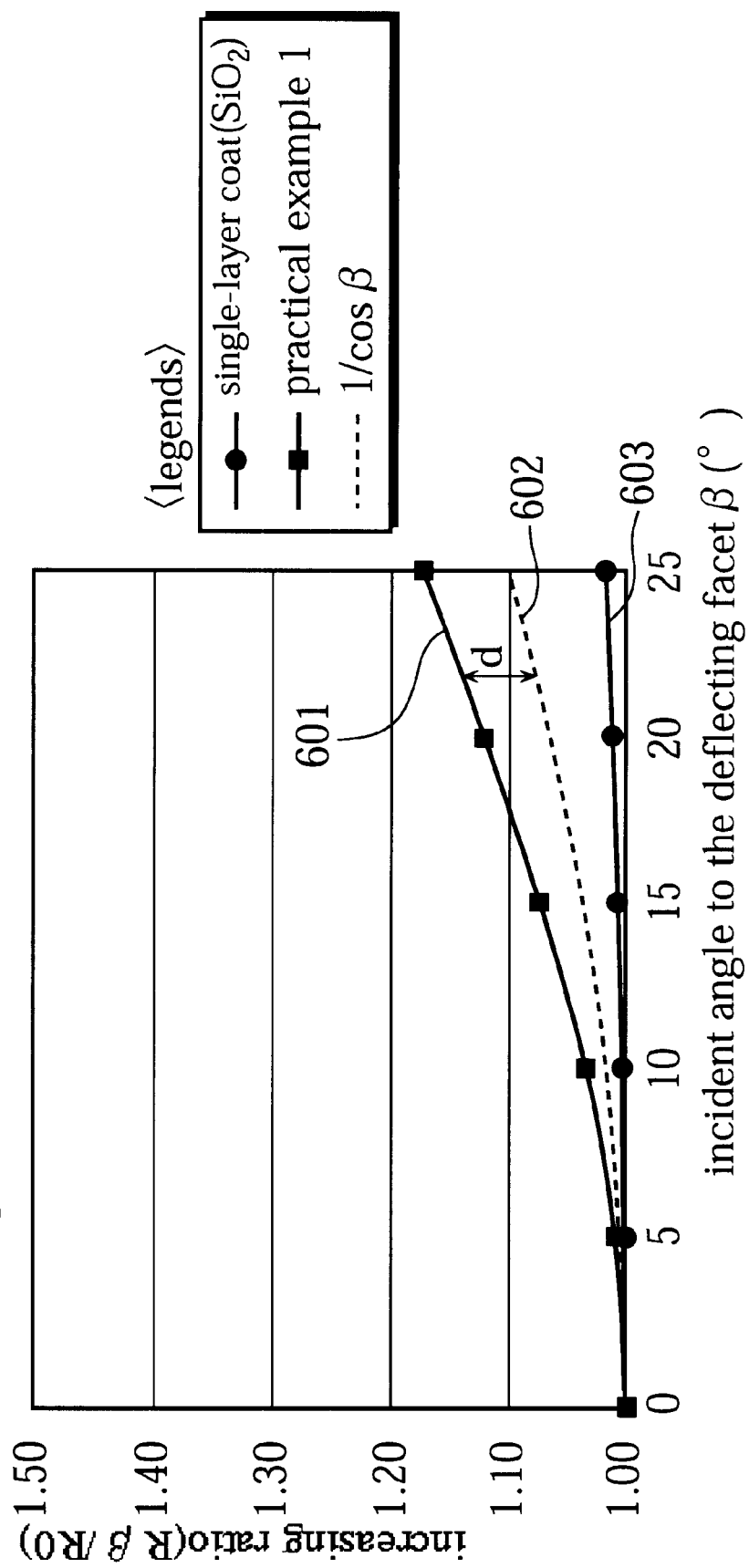
FIG. 7 shows the relationship between the increasing ratio of reflectance of the thin film layer and the deflecting facet incident angle β.

FIG. 7 shows the increasing ratio of reflectance (Rβ/R0) for each deflecting facet incident angle β by setting the reflectance R0 at "1" when the deflecting facet incident angle β is "0" for the thin film layer 50 formed on the deflecting facet 241.

FIG. 7 also shows the reflectance of the deflecting facet 241 onto which only $SiO_2$ has been applied not particularly for improving the light quantity evenness (the reflectance of single-layer of $SiO_2$) and the value of 1/cos β as comparative data.

A line 602 indicating the value of 1/cos β serves as the guide of the increasing ratio of reflectance with which the degree of the light quantity to be decreased by the change of the luminous flux width (refer to FIG. 4) can be corrected. This can be explained as follows. The luminous flux width of the reflected laser beam B2 against the deflecting facet incident angle β (=angle of deflection θ÷2) decreases approximately proportionate to the value of cos β. As a result, in order to correct the degree of the light quantity to be decreased by the decrease of the luminous flux width, the reflectance should be increased according to the proportion of the inverse number of the value cos β.

The reflectance of the single-layer of $SiO_2$ indicated by a line 603 has tremendously small increasing ratio against the deflecting facet incident angle β. As a result, the light quantity that decreases as the deflecting facet incident angle β increases cannot be prevented by the single-layer of $SiO_2$.

A line 601 indicating the increasing ratio of the reflectance of the thin film layer 50 (the practical example 1) shows that the value of the reflectance increasing ratio always exceeds the value of 1/cos β. This is because light quantity decrease that is caused by narrowing beam luminous flux approximately proportionate to the value of cos β and light quantity change caused by the change of the area of the intensity distribution of the laser beam B1 corresponding to the reflected laser beam B2 (the areas S1, S2, and S3) shown in FIG. 5 need to be corrected. More specifically, the difference "d" between the increasing ratio of the reflectance indicated by the line 601 and the value of 1/cos β indicated by the line 602 corresponds to the corrected degree of the light quantity decrease due to the change of the beam intensity distribution of the reflected laser beam B2.

Note that the light quantity decrease due to the change of the beam intensity distribution of the reflected laser beam B2 depends on the conditions of the optical scanner design. As a result, the degree of the light quantity decrease only has the tendency "to increase as the deflecting facet incident angle β increases". The relationship between the decreasing degree and the deflecting facet incident angle β cannot be clearly defined as "proportionate to the value of cos β". Under the circumstances, how the value of the light quantity decrease due to the change of the beam intensity distribution of the reflected laser beam changes according to the deflecting facet incident angle β is calculated by simulation in advance, and the conditions for forming the thin film layer for light quantity correction is designed so as to correct the calculated value. According to the calculation at the time of designing, the difference "d" in FIG. 7 has the value approximate to the degree of the light quantity decrease due to the change of the beam intensity distribution in the optical system 20. The value of the difference "d" (the increasing ratio of the thin film layer reflectance) is adjusted by changing the conditions for forming the thin film layer (which optical element is provided with the thin film layer, the number of layers included in the thin film layer, the medium, and the thickness).

As has been described, for the overfilled laser optical scanner (optical system 20) in the preferred embodiment, the scanning center axis L1 of the scanning lenses 25 and 26, the principal ray L3 of the laser beam B1 that is applied to the polygon mirror 24, and the rotational axis of the polygon mirror 24 are in one plane, and the decrease of light quantity for photo conductor exposure can be corrected by forming the thin film layer 50 with the property of having larger reflectance as the deflecting facet incident angle β (angle of deflection θ÷2) increases on the deflecting facets 241 of the polygon mirror 24. As a result, the surface of the photo conductor can be exposed with an approximately certain level of exposure strength.

The reflectance increasing ratio of the deflecting facet 241 of the polygon mirror 24 is adjusted with the thin film layer 50 in the preferred embodiment. Note that the thin film layer 50 is only an example and the present invention is not limited to the thin film layer 50. The thin film layer may be formed on the plane of incidence of an optical element other than the polygon mirror, for instance, on the reflecting mirror 28. Also, the thin film layer may be formed on the plane of incidence of an optical element through which the reflected beam passes (for instance, the scanning lens 25 or 26, the window 27, or the second cylindrical lens 29 in the optical system 20) to adjust the increasing ratio of the transmissivity.

More specifically, when a facet or plane that satisfies the condition that "the incident angle of the deflected beam increases as the angle of deflection increases" is provided with a thin film that satisfies the condition that "the reflectance or the transmissivity increases as the incident angle increases", the same effect as the preferred embodiment can be obtained in the present invention.

FIG. 8 shows four pattern for forming the thin film layer including the thin film layer 50 (indicated as the practical example 1) in tabular form. The four patterns are formed on different places and on different conditions.

The practical example 2 is a thin film layer formed on the deflecting facets or the plane of incidence of the reflecting mirror on conditions different from the thin film layer 50 (the practical example 1). The practical examples 3 and 4 are examples of thin film layer formed on the plane of incidence of an optical element on conditions different from the practical example 1.

The medium of the layers in the thin film layers aside from the practical example 4 are $TiO_2$ or $SiO_2$ as in the case of the practical example 1. For one layer in the practical 4, aluminum oxide ($Al_2O_3$) is used as the medium. The number of layers in one thin film layer is two to four.

Here, the measurement results of the value of the reflectance and transmissivity and the increasing ratios of the reflectance and transmissivity against an angle that the normal line at a point, where the beam is applied to a plane or facet that is provided with a thin film layer, to the plane or facet forms with the principal ray of the beam applied to the plane or facet (referred to the "incident angle α" in this specification) will be given below for the practical examples 1 to 4.

FIG. 9 shows the increasing ratio of the reflectance Rα for each value of the incident angle α (0 to 25 degree) when the thin film layer is formed on the deflecting facet (in the case of the practical examples 1 and 2) by setting the reflectance R0 at "1" when the incident angle α is "0". In addition to the data of the practical examples 1 and 2, data when a "single-layer of $SiO_2$" is formed (data of the reflectance of the plane of incidence on which a conventional single-layer thin film layer has been formed) is shown as comparative data.

Figure 10:
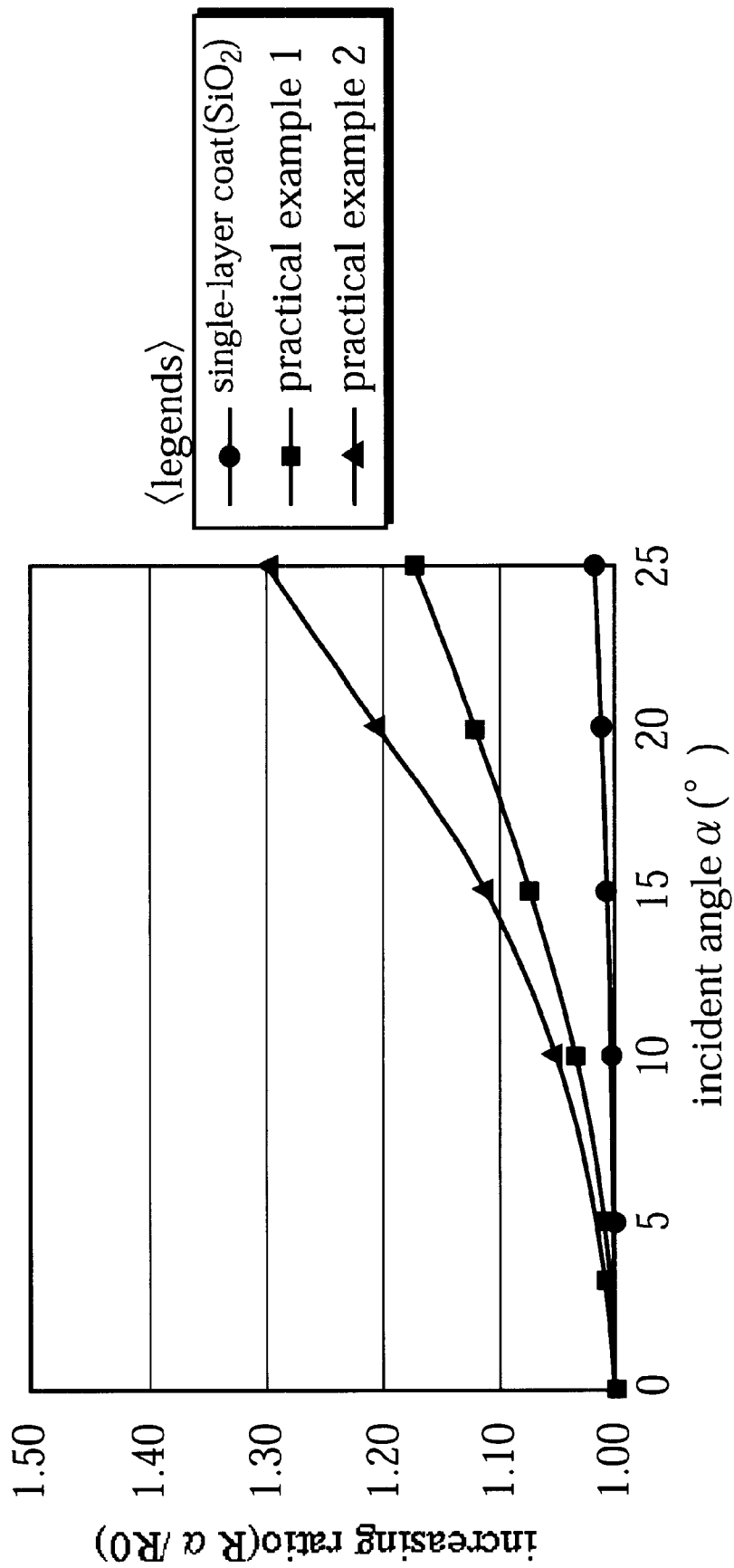
FIG. 10 represents the relationship between the increasing ratio of reflectance and the incident angle α in graphical form when the thin film layer is formed on the reflective ,surface.

FIG. 10 shows the data in FIG. 9 in graphical form.

Showing higher increasing ratio compared with the "single-layer of $SiO_2$", the practical examples 1 and 2 have an effect of correcting the decrease of the exposure light quantity. The increasing ratio for the practical examples 1 and 2 are different since the conditions on which the thin film layers have been formed (the number of layers included in the layer and the thickness) are different.

FIG. 11 shows the increasing ratio of the transmissivity Tα for each value of the incident angle α (0 to 25 degree) when the thin film layer is formed on the plane of incidence (in the case of the practical examples 3 and 4) by setting the transmissivity T0 at "1" when the incident angle α is "0". In addition to the data of the practical examples 3 and 4, data when a "single-layer of $MgF_2$" is formed (data of the transmissivity when a conventional single-layer thin film layer is formed) is shown as comparative data.

Figure 12:
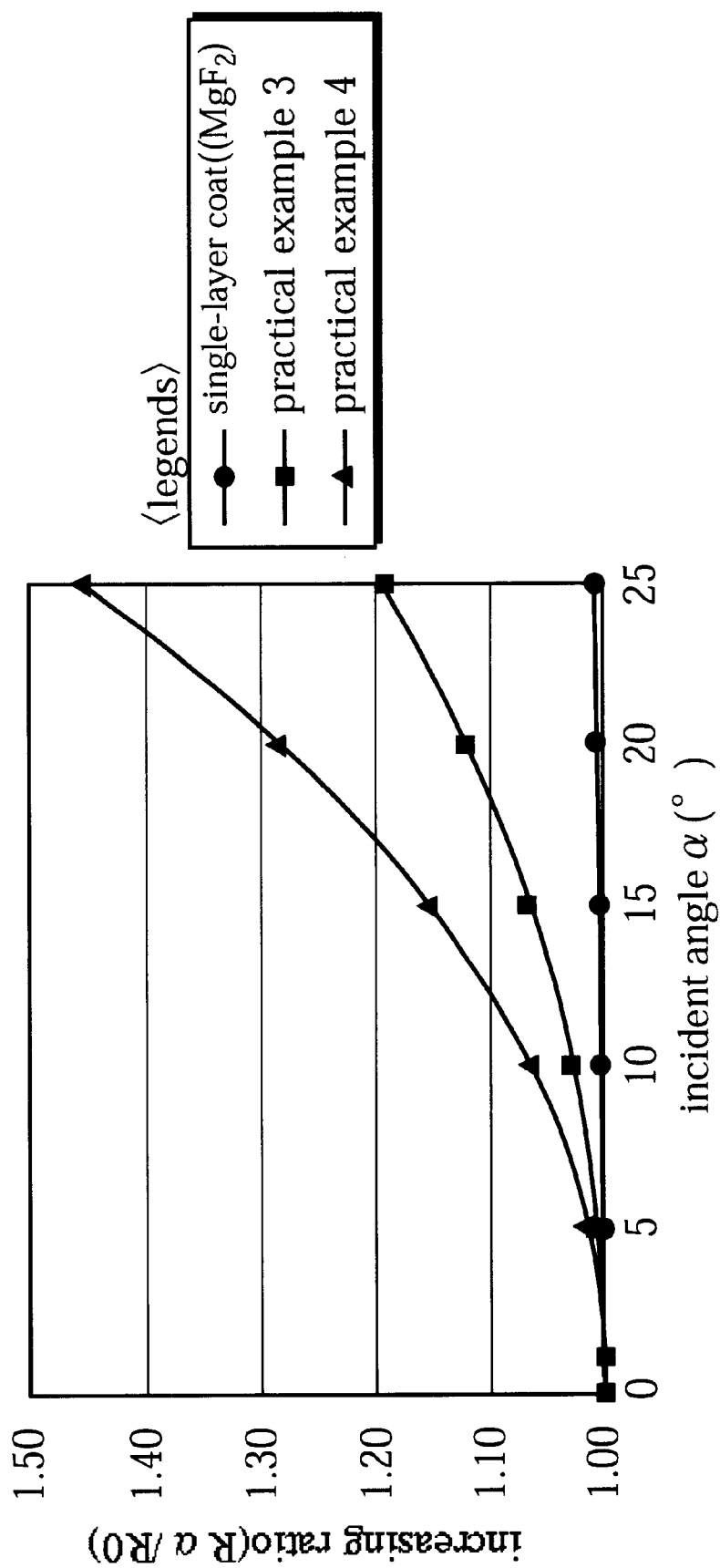
FIG. 12 represents the relationship between the increasing ratio of transmissivity and the incident angle α in graphical form when the thin film layer is formed on the incidence plane of the optical element.

FIG. 12 shows the data in FIG. 11 in graphical form.

Showing higher increasing ratio compared with the "single-layer of $MgF_2$", the practical examples 3 and 4 have an effect of correcting the decrease of the exposure light quantity.

Note that while the minimum increasing ratios of the reflectance and transmissivity are both supposed to exceed the value of $1/\cos \beta$, i.e., the value of $1/\cos \beta$ serves as the guide in the preferred embodiment, the guide is not absolute. With higher increasing ratio compared with the conventional case in which a single-layer thin film layer is formed, the thin film layer can have the effect of correcting the light quantity decrease.

Originally, intended for increasing the number of the deflecting facets, the overfilled optical scanner has at least 10 deflecting facets. When the number of the deflecting facets is 10, the angle of deflection θ is within ±36 degree in the optical system of the preferred embodiment. In addition, when the maximum scanning efficiency (the proportion of the width of the deflecting facet used for deflecting the beam according to image data) is 90%, the maximum angle of deflection θ is 36 degree×0.9=32.4 degree. As a result, it is satisfactory to have the incident angle α up to 33 degree and higher increasing ratio compared with a conventional case in which a single-layer thin film layer is formed.

Note that while the thin film layer is formed only on the deflecting facets of the polygon mirror in the preferred embodiment, the thin film layer can be formed on the plane of incidence of an optical element or the plane of an optical element from which the laser beam that has been applied to the optical element emits (emission plane for transmitted light). When the thin film layer is formed on a plurality of planes, the exposure light quantity can be adjusted more precisely than the case in which the thin film layer is formed only one plane.

Note that while the copying machine has been taken as the example in the preferred embodiment, the light beam optical scanner of the present invention can be applicable to other image forming apparatus such as the printer and the facsimile.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. A light beam optical scanner, comprising:

a light source that emits a light beam;

a deflector having a plurality of deflecting facets that have widths smaller than a width of the light beam, at least two of the deflecting facets being irradiated by the light beam and deflecting the light beam;

an optical element that is disposed so that a deflected light beam is applied to the optical element, the deflected light beam being a beam that has been deflected by one of the deflecting facets, the optical element being one of a first optical element through which the deflected light beam passes and a second optical element that reflects the deflected light beam, an incident angle of the deflected light beam applied to an incidence plane of the optical element changing according to an angle of deflection at which the deflecting facet has deflected the light beam; and a thin film with which at least one of an incidence plane of the first optical element, an incidence plane of the second optical element, an emission plane of the first optical element, and the deflecting facet is provided, reflectance and transmissivity of the thin film depending on the incident angle.

2. The light beam optical scanner according to claim 1, wherein when the deflecting facet is provided with the thin film, the plurality of deflecting facets are provided with the thin film.

3. The light beam optical scanner according to claim 1, wherein the reflectance and the transmissivity of the thin film increase as the incident angle increases.

4. The light beam optical scanner according to claim 3, wherein the incident angle and the reflectance have a relation, $(R\alpha/R0) > 1/\cos \alpha$, wherein "R0" is the reflectance when the incident angle is 0 degrees and "Rα" is the reflectance when the incident angle is α degrees, and the incident angle and the transmissivity have a relation, $(T\alpha/T0) > 1/\cos \alpha$, wherein "T0" is the transmissivity when the incident angle is 0 degrees and "Tα" is the transmissivity when the incident angle is α degrees.

5. The light beam optical scanner according to claim 1, wherein the deflector is a rotating polygon mirror having at least 10 deflecting facets.

6. The light beam optical scanner according to claim 1, wherein a photo conductor is disposed so that one of the deflected light beam that has passed through the first optical element and the deflected light beam that has been reflected by the second optical element is applied to the photo conductor, and the photo conductor is exposed by one of the deflected light beam that has passed through the first optical element and the deflected light beam that has been reflected by the second optical element.

7. A light beam optical scanner, comprising:

a light source that emits a light beam; and a deflector for scanning an object to be irradiated, the deflector deflecting a part of the light beam with a deflecting facet provided with a thin film while changing an angle of deflection, the angle of deflection being an angle that a principal ray of the light beam forms with a principal ray of a deflected light beam, wherein the thin film absorbs the light beam, an amount of the absorbed light beam increasing as the angle of deflection decreases.

8. The light beam optical scanner according to claim 7, wherein a reflectance of the thin film and the angle of deflection have a relation, R>1/cos (θ/2), wherein "R" is the reflectance and "θ" is the angle of deflection.

9. An image forming apparatus, comprising:

a light source unit that emits a light beam according to image information;

a polygon mirror having a plurality of deflecting facets that have widths smaller than a width of the light beam, the deflecting facets for deflecting the light beam, which has been applied to the polygon mirror so that the width of the light beam covers an entire width of one of the deflecting facets;

an optical element that is disposed so that a deflected light beam is applied to the optical element, the deflected light beam being a beam that has been deflected by the deflecting facet, the optical element being one of a first optical element through which the deflected light beam passes and a second optical element that reflects the deflected light beam;

a photo conductor that receives one of the deflected light beam that has passed through the first optical element and the deflected light beam that has been reflected by the second optical element, the photo conductor forming a latent image;

a thin film that is disposed in an optical path between the deflecting facets and the photo conductor, the thin film being one of a first thin film through which the deflected light beam passes and a second thin film that reflects one of the light beam and the deflected light beam, wherein an amount of the deflected light beam that passes through the first thin film increases as an incident angle of a principal ray of the reflected light beam to the first thin film increases, an amount of the light beam reflected by the second thin film increases as a reflection angle of a principal ray of the light beam to the second thin film increases, and an amount of the deflected light beam reflected by the second thin film increases as a reflection angle of the principal ray of the reflected light beam to the second thin film increases.

10. The image forming apparatus according to claim 9, wherein the deflecting facets of the polygon mirror are provided with the thin film.

11. The image forming apparatus according to claim 10, wherein a reflectance of the thin film depends on an angle of deflection, the angle of deflection being an angle that the principal ray of the light beam forms with a principal ray of the deflected light beam.

12. The image forming apparatus according to claim 11, wherein the reflectance of the thin film increases as the angle of deflection increases.

13. The image forming apparatus according to claim 9, wherein at least one of an incidence plane of the first optical element, an incidence plane of the second optical element, and an emission plane of the first optical element is provided with the thin film.

* * * * *